Jan. 15, 1924.
C. C. WIGHT
PATCH FOR INNER TUBES
Filed March 30, 1922
1,480,976
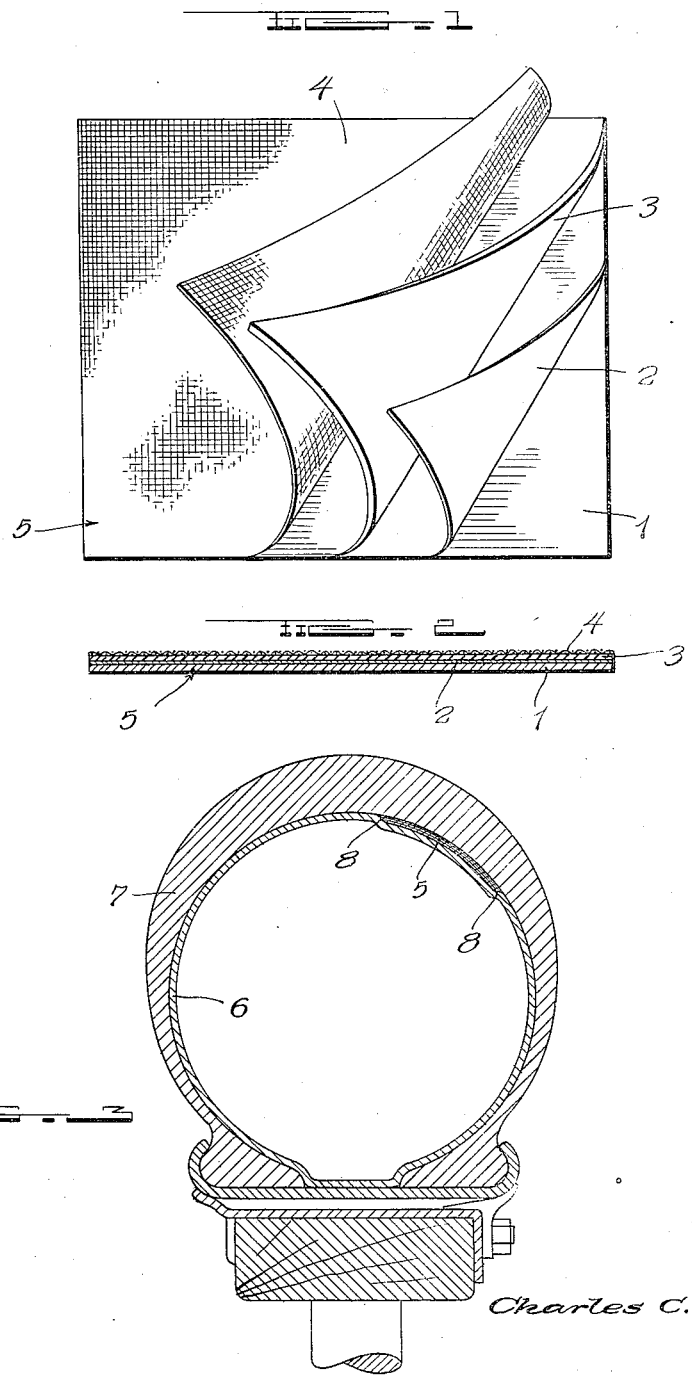
Inventor
Charles C. Wight
By Donald L. Mayson.
Attorney Patented Jan. 15, 1924.

1,480,976

UNITED STATES PATENT OFFICE.

CHARLES C. WIGHT, OF SAN ANTONIO, TEXAS.

PATCH FOR INNER TUBES.

Application filed March 30, 1922. Serial No. 548,099.

*To all whom it may concern:*

Be it known that CHARLES C. WIGHT, a citizen of the United States, residing at San Antonio, in the county of Bexar and State of Texas, has invented certain new and useful Improvements in Patches for Inner Tubes, of which the following is a specification.

This invention relates to improvements in automobile inner tube patches, and more particularly to that type of patch which does not require any cement to make it adhere to the said inner tube.

An object of the invention is to provide a suitable patch for an automobile inner tube, which does not require any extra preparation or means for cementing it to the inner tube, but merely requires the protecting covering to be removed and the patch placed in position, where it will immediately adhere to the tube, and become firmly vulcanized thereto.

Another object of the invention is to provide a suitable cold patch for an inner tube, which will be so constructed that when placed in position on the said tube and adhered thereto, will stretch with the tube and not pull away as is the case with many of the patches now in use which require the use of cement to make them adhere to the tube.

A further object of the invention is to provide a suitable cold patch for inner tubes which will be composed entirely of layers of rubber in different forms and textures.

Other objects will appear as the description proceeds.

In the accompanying drawings which constitute a part of my application,

Figure 1 is a front elevation of my improved cold patch, showing the several layers partially raised;

Figure 2 is a longitudinal sectional view of my patch, showing the relation and thickness of the several layers, and Figure 3 is a cross section through a tube and tire showing the patch applied to the tube.

Like characters of reference are used throughout the following specification to designate corresponding parts.

The layer 1 of the patch is the one towards the outside, and is formed of cured gum having a tensile strength of approximately two thousand pounds per square inch, which affords a heavy backing for the patch as well as one which will stretch as much as required when the tube to which it is attached is inflated.

Layer 2 is composed of very thin raw rubber which is permanently vulcanized to make it partly raw and partly cured. This layer lies adjacent to the layer 1 and in contact therewith.

Adjacent to and in contact with the layer 2 is a layer 3 of pure cushion rubber or floating stock, which is very adhesive and pliable. These three layers 1, 2 and 3 are firmly held together, and are so pliable that they will stretch or give sufficiently to meet any requirements when positioned on an inner tube.

Adjacent to the layer 3 and in contact therewith, is a thin sheet or layer of white glazed canvas 4, which protects the surface or layer 3 from the air or any possible harm.

In Figure 3 of the drawings, a patch 5 is shown in position on the tube 6, within the tire casing 7. The patch 5 will conform to the surface of the tube so closely that the tube will be approximately even where it engages the inner face of the casing 7. The pliable nature of the patch 5 is well illustrated in Figure 3 of the drawings, by the beveled surfaces 8, which shows that the patch will yield or stretch when the tube is expanded, and will not pull off or come loose as is customary with most all of the patches which require a rubber cement to make them adhere to the tube. As before mentioned, my patch is formed from an outer layer of cured rubber, an inner layer of cushioning or adhesive rubber, and an intermediate layer of raw gum or rubber which is vulcanized to the adjacent surface of the cured rubber. It is a well known fact that when rubber is vulcanized, sulphur is employed, usually under pressure and with heat. It is also known that sulphur is migratory, and it is therefore my invention and reason for placing the intermediate layer of raw gum or rubber between the layer of cured rubber and the layer of adhesive rubber, so that when the sulphur migrates, it will only get into the intermediate layer of raw gum or rubber, thereby leaving the lower layer of adhesive rubber soft and pliable after the cured rubber and raw gum or rubber have been vulcanized together.

It will be understood that this cold patch does not require the use of any kind of cement to make it adhere to the tube. All that is necessary is to slightly roughen the surface of the tube where the puncture occurs, and then carefully remove the protecting covering of canvas 4 and firmly press the patch down in place. It will be found that the patch will adhere immediately, and that it will not pull off. The heat caused by friction when the tube is in the casing will only serve to more firmly fix the patch to the tube. This type of patch needs no prior cleaning of the surface of the tube with gasoline or any other solvent, but is ready to put on at any time after first slightly roughening the surface of the tube adjacent the blow-out or puncture.

Many minor changes in detail of construction may be resorted to without departure from the spirit of the invention.

Having thus described my invention what I claim as new and desire to secure by Letters Patent of the United States is:

1. A cementless patch for inner tubes comprising a layer of cured rubber, a layer of cushioning or adhesive rubber, and an intermediate layer of raw gum or rubber, said raw gum or rubber being vulcanized to the adjacent surface of the cured rubber, substantially as described.

2. A cementless patch for inner tubes comprising an outer layer of cured rubber, an adjacent layer of raw gum or rubber, a layer of adhesive or cushioning rubber adjacent said layer of raw or gum rubber, and a protecting layer of glazed canvas, the layers of cured rubber and raw gum or rubber being vulcanized together.

In testimony whereof I affix my signature.

CHARLES C. WIGHT.